(No Model.)
E. G. LATTA.
CHAIN GEARING.
No. 456,729. Patented July 28, 1891.
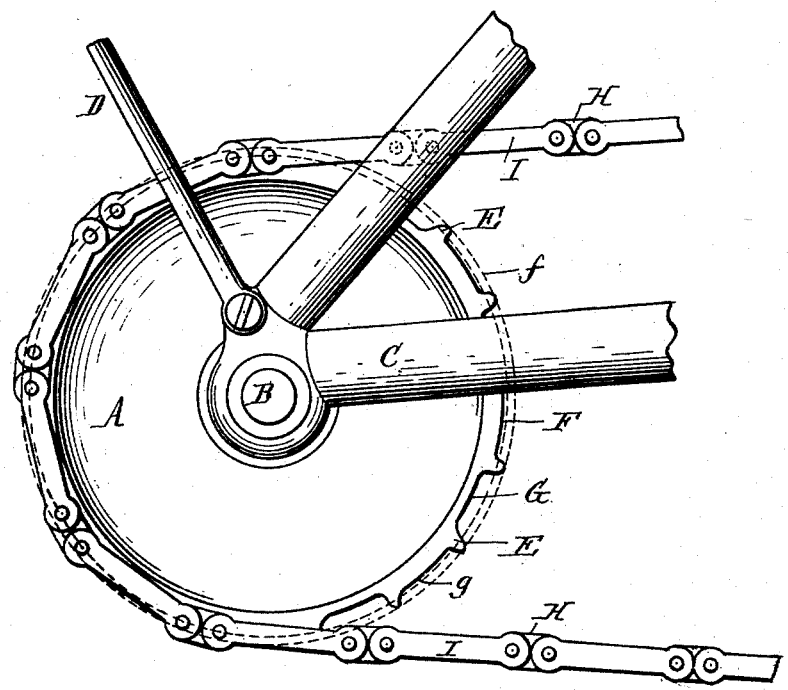
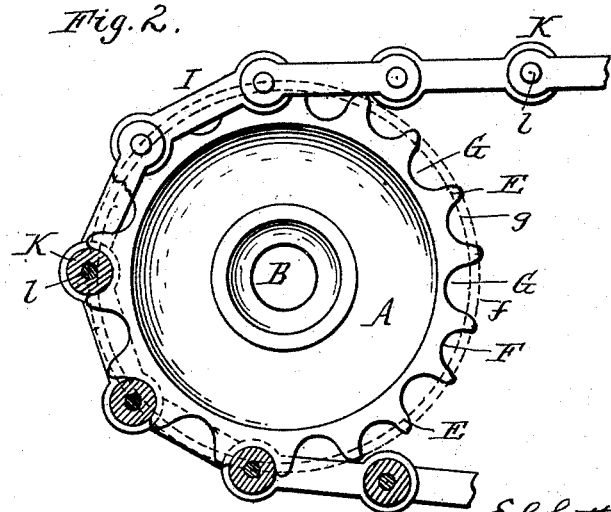
Witnesses:
Friedrich Gustav Wilhelm
Emil Neuhart
E. G. Latta — Inventor.
By Wilhelm Bonner
Attorneys.

UNITED STATES PATENT OFFICE.

EMMIT G. LATTA, OF FRIENDSHIP, NEW YORK.

CHAIN-GEARING.

SPECIFICATION forming part of Letters Patent No. 456,729, dated July 28, 1891.

Application filed January 26, 1891. Serial No. 379,026. (No model.)

*To all whom it may concern:*

Be it known that I, EMMIT G. LATTA, a citizen of the United States, residing at Friendship, in the county of Allegany and State of New York, have invented new and useful Improvements in Chain-Gearing, of which the following is a specification.

This invention relates to a chain-gearing which comprises sprocket-wheels and a drive-chain running over the same, and is applicable to a variety of uses, but is especially desirable in structures in which a nice fit of the chain on the wheel is required—as, for instance on the better class of velocipedes.

My invention has the object to improve the construction of the sprocket-wheels in such manner that when the chain has become loose by wear it can be tightened by shifting it circumferentially on the wheel into a different set of recesses or spaces.

In the accompanying drawings, Figure 1 is a fragmentary elevation of the chain-gear of a velocipede embodying my improvements. Fig. 2 is a fragmentary sectional elevation showing a modified form of my chain-gearing.

Like letters of reference refer to like parts in both figures.

A represents a sprocket-wheel; B, the axle thereof; C, a portion of the supporting-frame of a velocipede in which said axle is journaled, and D the back stay or brace of the frame.

E represents the sprockets formed on the periphery or face of the wheel, and F G are the spaces or recesses formed between the sprockets. The sprockets and recesses are arranged on the face of the wheel in such manner that two or more recesses are provided for each chain-link and that the cross-bar of each link engages with but one of these recesses at a time, while the remaining recess or recesses are out of service for the time being, thereby forming several succeeding sets of bearings for the chain circumferentially around the wheel, in each of which the chain can be placed while the recesses of the idle set or sets stand between the recesses of those which are in use. The recesses F alternate with similar deep recesses G, so that the bottoms of the deep recesses G are nearer the axis of the wheel than the bottoms of the shallower recesses F. By varying the depth of the recesses in the face of the wheel two different pitch-circles $fg$ are formed, in either of which the cross-bars of the drive-chain may travel.

The chain consists, essentially, of cross-bars H and links or side bars I pivotally connected to the cross-bars.

When the chain is new and its joints are tight, the chain is placed upon the wheel so that its cross-bars engage in the deepest recesses, thereby causing the chain to travel in the inner or smaller pitch-circle $g$ of the wheel. As the joints of the chain and the faces of the cross-bars of the wheel have become worn the length of the chain is increased and the chain becomes loose and rattles. In order to remedy this the chain is removed from the deep recesses and its cross-bars are shifted to the next higher or shallower recesses F, thereby causing the chain to travel in the larger pitch-circle $f$ of the wheel, whereby the looseness of the chain is taken up. The ends of the cross-bars become slightly worn by constant abrasion with the ends of the recesses of the inner pitch-circle $g$. To compensate for this wear the recesses F of the outer pitch-circle $f$ are made sufficiently shorter in the peripheral direction to cause the worn cross-bars to fit snugly when shifted from the deep recesses G to the shallower recesses F.

In the construction represented in Fig. 2 the cross-bars of the chain consist of rollers K, which are mounted on transverse pins or rivets $l$ by which the adjoining ends of the side bars or links are secured together.

In the construction represented in the drawings two sets of recesses are formed on the wheel, so that two recesses which follow each other circumferentially are provided for each chain-link; but it is obvious that if the nature of the case requires it three or more recesses may be provided for each chain-link.

I claim as my invention—

1. A sprocket-wheel provided in its face with circumferential sets or series of recesses arranged at different distances from the axis of the wheel, substantially as set forth.

2. A sprocket-wheel provided in its face with circumferential sets of recesses of different lengths, substantially as set forth.

3. The combination of a sprocket-wheel provided in its face with several series of recesses which are arranged in pitch-circles of different radii, and a chain belt adapted to engage with either of said series of recesses, substantially as set forth.

Witness my hand this 23d day of January, 1891.

EMMIT G. LATTA.

Witnesses:
  HERMAN RICE,
  S. M. NORTON.